United States Patent
Song et al.

(10) Patent No.: US 9,736,085 B2
(45) Date of Patent: Aug. 15, 2017

(54) END-TO END LOSSLESS ETHERNET IN ETHERNET FABRIC

(75) Inventors: Huan Song, Milpitas, CA (US); Phanidhar Koganti, Hyderbad (IN); Mythilikanth Raman, San Jose, CA (US); Rajnish Gupta, Bangalore (IN)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 0 days.

(21) Appl. No.: 13/598,204

(22) Filed: Aug. 29, 2012

(65) Prior Publication Data
US 2013/0051235 A1 Feb. 28, 2013

Related U.S. Application Data

(60) Provisional application No. 61/528,683, filed on Aug. 29, 2011.

(51) Int. Cl.
*H04L 12/24* (2006.01)
*H04L 12/26* (2006.01)
(Continued)

(52) U.S. Cl.
CPC ........ *H04L 49/351* (2013.01); *H04L 47/2408* (2013.01); *H04L 47/6215* (2013.01);
(Continued)

(58) Field of Classification Search
CPC ......... H04L 45/28; H04L 47/10; H04L 47/35; H04L 47/30; H04L 47/32
(Continued)

(56) References Cited

U.S. PATENT DOCUMENTS

| 5,390,173 A | 2/1995 | Spinney |
| 5,802,278 A | 9/1998 | Isfeld |

(Continued)

FOREIGN PATENT DOCUMENTS

| CN | 1735062 | 2/2006 |
| CN | 101064682 | 10/2007 |

(Continued)

OTHER PUBLICATIONS

"Switched Virtual Internetworking moved beyond bridges and routers", 8178 Data Communications Sep. 23, 1994 , No. 12, New York.
(Continued)

*Primary Examiner* — Mang Yeung
*Assistant Examiner* — Natali N Pascual Peguero
(74) *Attorney, Agent, or Firm* — Shun Yao; Park, Vaughan, Fleming & Dowler LLP

(57) ABSTRACT

One embodiment of the present invention provides a computing system. The computing system includes a packet processor, a buffer management module, a data monitoring module, and a flow control module. The packet processor identifies a class of service indicating priority-based flow control associated with a remote computing system from a notification message. The buffer management module creates a buffer dedicated for frames belonging to the class of service from the remote computing system in response to identifying the class of service. The data monitoring module detects a potential overflow of the buffer. The flow control module operates in conjunction with the packet processor to generate a pause frame in response to detecting a potential overflow.

20 Claims, 11 Drawing Sheets

(51) Int. Cl.
*H04L 12/931* (2013.01)
*H04L 12/937* (2013.01)
*H04L 12/851* (2013.01)
*H04L 12/863* (2013.01)

(52) U.S. Cl.
CPC .......... *H04L 49/205* (2013.01); *H04L 49/253* (2013.01); *H04L 49/505* (2013.01)

(58) Field of Classification Search
USPC ........................................ 370/218, 235, 392
See application file for complete search history.

(56) References Cited

U.S. PATENT DOCUMENTS

| | | | |
|---|---|---|---|
| 5,878,232 A | 3/1999 | Marimuthu | |
| 5,879,173 A | 3/1999 | Poplawski | |
| 5,959,968 A | 9/1999 | Chin | |
| 5,973,278 A | 10/1999 | Wehrill, III | |
| 5,983,278 A | 11/1999 | Chong | |
| 5,995,262 A | 11/1999 | Hirota | |
| 6,041,042 A | 3/2000 | Bussiere | |
| 6,085,238 A | 7/2000 | Yuasa | |
| 6,092,062 A | 7/2000 | Lohman | |
| 6,104,696 A * | 8/2000 | Kadambi et al. ............. | 370/218 |
| 6,185,214 B1 | 2/2001 | Schwartz | |
| 6,185,241 B1 | 2/2001 | Sun | |
| 6,295,527 B1 | 9/2001 | McCormack | |
| 6,331,983 B1 | 12/2001 | Haggerty | |
| 6,438,106 B1 | 8/2002 | Pillar | |
| 6,498,781 B1 | 12/2002 | Bass | |
| 6,542,266 B1 | 4/2003 | Phillips | |
| 6,553,029 B1 | 4/2003 | Alexander | |
| 6,571,355 B1 | 5/2003 | Linnell | |
| 6,583,902 B1 | 6/2003 | Yuen | |
| 6,633,761 B1 | 10/2003 | Singhal | |
| 6,636,963 B1 | 10/2003 | Stein | |
| 6,771,610 B1 | 8/2004 | Seaman | |
| 6,870,840 B1 | 3/2005 | Hill | |
| 6,873,602 B1 | 3/2005 | Ambe | |
| 6,937,576 B1 | 8/2005 | DiBenedetto | |
| 6,956,824 B2 * | 10/2005 | Mark et al. .................... | 370/242 |
| 6,957,269 B2 * | 10/2005 | Williams et al. ............. | 709/235 |
| 6,975,581 B1 | 12/2005 | Medina | |
| 6,975,864 B2 | 12/2005 | Singhal | |
| 7,016,352 B1 | 3/2006 | Chow | |
| 7,061,877 B1 | 6/2006 | Gummalla | |
| 7,062,177 B1 | 6/2006 | Grivna | |
| 7,173,934 B2 | 2/2007 | Lapuh | |
| 7,197,308 B2 | 3/2007 | Singhal | |
| 7,206,288 B2 | 4/2007 | Cometto | |
| 7,310,664 B1 | 12/2007 | Merchant | |
| 7,313,637 B2 | 12/2007 | Tanaka | |
| 7,315,545 B1 * | 1/2008 | Chowdhury et al. ...... | 370/395.4 |
| 7,316,031 B2 | 1/2008 | Griffith | |
| 7,330,897 B2 | 2/2008 | Baldwin | |
| 7,380,025 B1 | 5/2008 | Riggins | |
| 7,397,794 B1 | 7/2008 | Lacroute | |
| 7,430,164 B2 | 9/2008 | Bare | |
| 7,453,888 B2 | 11/2008 | Zabihi | |
| 7,477,894 B1 | 1/2009 | Sinha | |
| 7,480,258 B1 | 1/2009 | Shuen | |
| 7,508,757 B2 | 3/2009 | Ge | |
| 7,558,195 B1 * | 7/2009 | Kuo et al. .................... | 370/219 |
| 7,558,273 B1 | 7/2009 | Grosser, Jr. | |
| 7,571,447 B2 | 8/2009 | Ally | |
| 7,599,901 B2 | 10/2009 | Mital | |
| 7,688,736 B1 * | 3/2010 | Walsh ............................ | 370/236 |
| 7,688,960 B1 | 3/2010 | Aubuchon | |
| 7,690,040 B2 | 3/2010 | Frattura | |
| 7,706,255 B1 | 4/2010 | Kondrat et al. | |
| 7,716,370 B1 | 5/2010 | Devarapalli | |
| 7,720,076 B2 | 5/2010 | Dobbins | |
| 7,729,296 B1 | 6/2010 | Choudhary | |
| 7,787,480 B1 * | 8/2010 | Mehta et al. .................. | 370/401 |
| 7,792,920 B2 | 9/2010 | Istvan | |
| 7,796,593 B1 | 9/2010 | Ghosh | |
| 7,801,021 B1 | 9/2010 | Triantafillis | |
| 7,808,992 B2 | 10/2010 | Homchaudhuri | |
| 7,836,332 B2 | 11/2010 | Hara | |
| 7,843,906 B1 | 11/2010 | Chidambaram et al. | |
| 7,843,907 B1 | 11/2010 | Abou-Emara | |
| 7,860,097 B1 | 12/2010 | Lovett | |
| 7,898,959 B1 | 3/2011 | Arad | |
| 7,912,091 B1 | 3/2011 | Krishnan | |
| 7,924,837 B1 | 4/2011 | Shabtay | |
| 7,937,438 B1 | 5/2011 | Miller | |
| 7,937,756 B2 | 5/2011 | Kay | |
| 7,945,941 B2 | 5/2011 | Sinha | |
| 7,949,638 B1 | 5/2011 | Goodson | |
| 7,957,386 B1 | 6/2011 | Aggarwal | |
| 8,018,938 B1 | 9/2011 | Fromm | |
| 8,027,354 B1 | 9/2011 | Portolani | |
| 8,054,832 B1 | 11/2011 | Shukla | |
| 8,068,442 B1 | 11/2011 | Kompella | |
| 8,078,704 B2 | 12/2011 | Lee | |
| 8,090,805 B1 | 1/2012 | Chawla | |
| 8,102,781 B2 | 1/2012 | Smith | |
| 8,102,791 B2 | 1/2012 | Tang | |
| 8,116,307 B1 | 2/2012 | Thesayi | |
| 8,125,928 B2 | 2/2012 | Mehta | |
| 8,134,922 B2 | 3/2012 | Elangovan | |
| 8,155,150 B1 | 4/2012 | Chung | |
| 8,160,063 B2 | 4/2012 | Maltz | |
| 8,160,080 B1 | 4/2012 | Arad | |
| 8,170,038 B2 | 5/2012 | Belanger | |
| 8,175,107 B1 | 5/2012 | Yalagandula | |
| 8,194,674 B1 | 6/2012 | Pagel | |
| 8,195,774 B2 | 6/2012 | Lambeth | |
| 8,204,061 B1 | 6/2012 | Sane | |
| 8,213,313 B1 | 7/2012 | Doiron | |
| 8,213,336 B2 | 7/2012 | Smith | |
| 8,230,069 B2 | 7/2012 | Korupolu | |
| 8,239,960 B2 | 8/2012 | Frattura | |
| 8,249,069 B2 | 8/2012 | Raman | |
| 8,270,401 B1 | 9/2012 | Barnes | |
| 8,295,291 B1 | 10/2012 | Ramanathan et al. | |
| 8,295,921 B2 | 10/2012 | Wang | |
| 8,301,686 B1 | 10/2012 | Appajodu | |
| 8,339,994 B2 | 12/2012 | Gnanasekaran | |
| 8,351,352 B1 | 1/2013 | Eastlake, III | |
| 8,369,335 B2 | 2/2013 | Jha | |
| 8,369,347 B2 | 2/2013 | Xiong | |
| 8,392,496 B2 | 3/2013 | Linden | |
| 8,451,717 B2 | 5/2013 | Venkataraman et al. | |
| 8,462,774 B2 | 6/2013 | Page | |
| 8,467,375 B2 | 6/2013 | Blair | |
| 8,520,595 B2 * | 8/2013 | Yadav et al. .................. | 370/328 |
| 8,599,850 B2 | 12/2013 | Jha | |
| 8,615,008 B2 | 12/2013 | Natarajan | |
| 8,619,788 B1 | 12/2013 | Sankaran | |
| 8,705,526 B1 | 4/2014 | Hasan | |
| 8,706,905 B1 | 4/2014 | McGlaughlin | |
| 8,717,895 B2 | 5/2014 | Koponen | |
| 8,724,456 B1 | 5/2014 | Hong | |
| 8,798,045 B1 | 8/2014 | Aybay | |
| 8,804,736 B1 | 8/2014 | Drake | |
| 8,806,031 B1 | 8/2014 | Kondur | |
| 8,826,385 B2 | 9/2014 | Congdon | |
| 8,918,631 B1 | 12/2014 | Kumar | |
| 8,937,865 B1 | 1/2015 | Kumar | |
| 8,995,272 B2 | 3/2015 | Agarwal | |
| 9,178,793 B1 | 11/2015 | Marlow | |
| 9,350,680 B2 | 5/2016 | Thayalan | |
| 9,438,447 B2 | 9/2016 | Basso | |
| 2001/0005527 A1 | 6/2001 | Vaeth | |
| 2001/0055274 A1 | 12/2001 | Hegge | |
| 2002/0019904 A1 * | 2/2002 | Katz ............................. | 710/316 |
| 2002/0021701 A1 | 2/2002 | Lavian | |
| 2002/0039350 A1 * | 4/2002 | Wang et al. ................ | 370/230.1 |
| 2002/0054593 A1 | 5/2002 | Morohashi | |
| 2002/0087723 A1 * | 7/2002 | Williams ............ | H04L 12/5602 709/240 |
| 2002/0091795 A1 | 7/2002 | Yip | |

(56) References Cited

U.S. PATENT DOCUMENTS

| | | |
|---|---|---|
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1* | 7/2003 | Feuerstraeter et al. ....... 370/235 |
| 2003/0147385 A1 | 8/2003 | Montalvo |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0008868 A1 | 1/2004 | Bornowski |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Schimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0122979 A1 | 6/2005 | Gross |
| 2005/0152335 A1 | 7/2005 | Lodha |
| 2005/0157645 A1* | 7/2005 | Rabie et al. .................. 370/230 |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0098589 A1 | 5/2006 | Kreeger |
| 2006/0126511 A1* | 6/2006 | Youn ........................ H04L 47/10 370/235 |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1* | 5/2007 | Parry et al. .................. 370/437 |
| 2007/0116224 A1 | 5/2007 | Burke |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1* | 9/2007 | Fitch et al. .................. 370/388 |
| 2007/0220059 A1 | 9/2007 | Lu |
| 2007/0226214 A1 | 9/2007 | Smits |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0057918 A1 | 3/2008 | Abrant |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens et al. |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0138577 A1 | 5/2009 | Casado |
| 2009/0138752 A1 | 5/2009 | Graham |

(56) References Cited

U.S. PATENT DOCUMENTS

| | | |
|---|---|---|
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1* | 12/2010 | Tripathi et al. ............... 370/392 |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | Mcdaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1* | 3/2011 | Rabie .................. H04L 12/2602 |
| | | 370/389 |
| 2011/0055274 A1 | 3/2011 | Scales et al. |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | Mcdysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1* | 12/2011 | Dunbar et al. ................ 370/392 |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva |
| 2012/0033668 A1 | 2/2012 | Humphries |
| 2012/0033669 A1 | 2/2012 | Mohandas |
| 2012/0033672 A1 | 2/2012 | Page |
| 2012/0042095 A1 | 2/2012 | Kotha |
| 2012/0063363 A1 | 3/2012 | Li |
| 2012/0075991 A1 | 3/2012 | Sugita |

(56) References Cited

U.S. PATENT DOCUMENTS

| | | |
|---|---|---|
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1* | 7/2012 | Berman ............ H04L 45/02 370/390 |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243539 A1* | 9/2012 | Keesara ............ 370/392 |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0287785 A1 | 11/2012 | Kamble |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0148546 A1 | 6/2013 | Eisenhauer |
| 2013/0156425 A1 | 6/2013 | Kirkpatrick |
| 2013/0194914 A1 | 8/2013 | Agarwal |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Udutha et al. |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0086253 A1 | 3/2014 | Yong |
| 2014/0105034 A1 | 4/2014 | Sun |
| 2014/0157251 A1 | 6/2014 | Hocker |
| 2014/0258446 A1 | 9/2014 | Bursell |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0355477 A1 | 12/2014 | Velayudhan et al. |
| 2015/0010007 A1 | 1/2015 | Matsuhira |
| 2015/0030031 A1 | 1/2015 | Zhou |
| 2015/0127618 A1 | 5/2015 | Alberti |
| 2015/0143369 A1 | 5/2015 | Zheng |
| 2015/0172098 A1 | 6/2015 | Agarwal |
| 2015/0195093 A1 | 7/2015 | Mahadevan et al. |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |

FOREIGN PATENT DOCUMENTS

| | | |
|---|---|---|
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102415065 | 4/2012 |
| CN | 102415065 A | 4/2012 |
| CN | 102801599 | 11/2012 |
| CN | 102801599 A | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 12/2008 |
| EP | 2874359 | 5/2015 |
| JP | 2009049940 A * | 3/2009 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2014031781 | 2/2014 |

OTHER PUBLICATIONS

S. Night et al., "Virtual Router Redundancy Protocol", Network Working Group, XP-002135272, Apr. 1998.

Eastlake 3rd., Donald et al., "RBridges: TRILL Header Options", Draft-ietf-trill-rbridge-options-00.txt, Dec. 24, 2009.

J. Touch, et al., "Transparent Interconnection of Lots of Links (TRILL): Problem and Applicability Statement", May 2009.

Perlman, Radia et al., "RBridge VLAN Mapping", Draft-ietf-trill-rbridge-vlan-mapping-01.txt, Dec. 4, 2009.

Brocade Fabric OS (FOS) 6.2 Virtual Fabrics Feature Frequently Asked Questions.

(56) References Cited

OTHER PUBLICATIONS

Perlman, Radia "Challenges and Opportunities in the Design of TRILL: a Routed layer 2 Technology", XP-002649647, 2009.
Nadas, S. et al., "Virtual Router Redundancy Protocol (VRRP) Version 3 for IPv4 and IPv6", Mar. 2010.
Perlman, Radia et al., "RBridges: Base Protocol Specification", draft-ietf-trill-rbridge-protocol-16.txt, Mar. 3, 2010.
Christensen, M. et al., "Considerations for Internet Group Management Protocol (IGMP) and Multicast Listener Discovery (MLD) Snooping Switches", May 2006.
Lapuh, Roger et al., "Split Multi-link Trunking (SMLT)", Oct. 2002.
Lapuh, Roger et al., "Split Multi-link Trunking (SMLT) draft-lapuh-network-smlt-08", 2008.
"Switched Virtual Internetworking moves beyond bridges and routers", Sep. 23, 1994, No. 12, New York, US.
Knight, S. et al. "Virtual Router Redundancy Protocol", Apr. 1998, XP-002135272.
Eastlake, Donald et al., "RBridges: TRILL Header Options", Dec. 2009.
Touch, J. et al., "Transparent Interconnection of Lots of Links (TRILL): Problem and Applicability Statement", May 2009.
Perlman, Radia et al., "RBridge VLAN Mapping", Dec. 2009.
"Brocade Fabric OS (FOS) 6.2 Virtual Fabrics Feature Frequently Asked Questions".
Perlman, Radia et al., "RBridges: Base Protocol Specification", Mar. 2010.
Louati, Wajdi et al., "Network-Based Virtual Personal Overlay Networks Using Programmable Virtual Routers", 2005.
Knight, Paul et al., "Network based IP VPN Architecture using Virtual Routers", May 2003.
Kreeger, L. et al. "Network Virtualization Overlay Control Protocol Requirements draft-kreeger-nvo3-overlay-cp-00", Aug. 2, 2012.
An Introduction to Brocade VCS Fabric Technology, Dec. 3, 2012.
Knight, Paul et al. "Layer 2 and 3 Virtual Private Networks: Taxonomy, Technology, and Standardization Efforts", 2004.
Narten, T. et al. "Problem Statement: Overlays for Network Virtualization draft-narten-nvo3-overlay-problem-statement-01", Oct. 31, 2011.
The Effortless Network: HyperEdge Technology for the Campus LAN, 2012.
FastIron and Turbulron 24x Configuration Guide, 2010.
FastIron Configuration Guide, Supporting IronWare Software Release 07.0.00, 2009.
Foundary FastIron Configuration Guide, Software Release FSX 04.2.00b, Software Release FWS 04.3.00, Software Release FGS 05.0.00a, 2008.
Brocade Unveils "The Effortless Network", 2009.
Office Action for U.S. Appl. No. 12/725,249, filed Mar. 16, 2010, dated Sep. 12, 2012.
Office Action for U.S. Appl. No. 12/725,249, filed Mar. 16, 2010, dated Apr. 26, 2013.
Office Action for U.S. Appl. No. 13/087,239, filed Apr. 14, 2011, dated Dec. 5, 2012.
Office Action for U.S. Appl. No. 13/087,239, filed Apr. 14, 2011, dated May 22, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,580, filed Apr. 22, 2011, dated Jun. 10, 2013.
Office Action for U.S. Appl. No. 13/042,259, filed Mar. 7, 2011, dated Mar. 18, 2013.
Office Action for U.S. Appl. No. 13/092,460, filed Apr. 22, 2011, dated Jun. 21, 2013.
Office Action for U.S. Appl. No. 13/042,259, filed Mar. 7, 2011, dated Jul. 31, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,752, filed Apr. 22, 2011, dated Feb. 5, 2013.
Office Action for U.S. Appl. No. 13/092,752, filed Apr. 22, 2011, dated Jul. 18, 2013.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 12/950,968, filed Nov. 19, 2010, dated Jun. 7, 2012.
Office Action for U.S. Appl. No. 12/950,968, filed Nov. 19, 2010, dated Jan. 4, 2013.
Office Action for U.S. Appl. No. 13/092,864, filed Apr. 22, 2011, dated Sep. 19, 2012.
Office Action for U.S. Appl. No. 13/098,360, filed Apr. 29, 2011, dated May 31, 2013.
Office Action for U.S. Appl. No. 13/044,326, filed Mar. 9, 2011, dated Oct. 2, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/030,688, filed Feb. 18, 2011, dated Apr. 25, 2013.
Office Action for U.S. Appl. No. 13/044,301, filed Mar. 9, 2011, dated Jun. 11, 2013.
Office Action for U.S. Appl. No. 13/044,301, filed Mar. 9, 2011, dated Feb. 22, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/184,526, filed Jul. 16, 2011, dated Jan. 28, 2013.
Office Action for U.S. Appl. No. 13/184,526, filed May 22, 2013, dated May 22, 2013.
Office Action for U.S. Appl. No. 13/092,873, filed Apr. 22, 2011, dated Jun. 19, 2013.
Office Action for U.S. Appl. No. 13/365,993, filed Feb. 3, 2012, dated Jul. 23, 2013.
Office Action for U.S. Appl. No. 13/365,808, filed Feb. 3, 2012, dated Jul. 18, 2013.
Office Action for U.S. Appl. No. 13/312,903, filed Dec. 6, 2011, dated Jun. 13, 2013.
Office Action for U.S. Appl. No. 13/598,204, filed Aug. 29, 2012, dated Feb. 20, 2014.
Zhai F. Hu et al. "RBridge: Pseudo-Nickname; draft-hu-trill-pseudonode-nickname-02.txt", May 15, 2012.
Huang, Nen-Fu et al., "An Effective Spanning Tree Algorithm for a Bridged LAN", Mar. 16, 1992.
Office Action dated Jun. 6, 2014, U.S. Appl. No. 13/669,357, filed Nov. 5, 2012.
Office Action dated Feb. 20, 2014, U.S. Appl. No. 13/598,204, filed Aug. 29, 2012.
Office Action dated May 14, 2014, U.S. Appl. No. 13/533,843, filed Jun. 26, 2012.
Office Action dated May 9, 2014, U.S. Appl. No. 13/484,072, filed May 30, 2012.
Office Action dated Feb. 28, 2014, U.S. Appl. No. 13/351,513, filed Jan. 17, 2012.
Office Action dated Jun. 18, 2014, U.S. Appl. No. 13/440,861, filed Apr. 5, 2012.

(56) References Cited

OTHER PUBLICATIONS

Office Action dated Mar. 6, 2014, U.S. Appl. No. 13/425,238, filed Mar. 20, 2012.
Office Action dated Apr. 22, 2014, U.S. Appl. No. 13/030,806, filed Feb. 18, 2011.
Office Action dated Jun. 20, 2014, U.S. Appl. No. 13/092,877, filed Apr. 22, 2011.
Office Action dated Apr. 9, 2014, U.S. Appl. No. 13/092,752, filed Apr. 22, 2011.
Office Action dated Mar. 26, 2014, U.S. Appl. No. 13/092,701, filed Apr. 22, 2011.
Office Action dated Mar. 14, 2014, U.S. Appl. No. 13/092,460, filed Apr. 22, 2011.
Office Action dated Apr. 9, 2014, U.S. Appl. No. 13/092,724, filed Apr. 22, 2011.
Office Action for U.S. Appl. No. 13/533,843, filed Jun. 26, 2012, dated Oct. 21, 2013.
Office Action for U.S. Appl. No. 13/351,513, filed Jan. 17, 2012, dated Feb. 28, 2014.
Office Action for U.S. Appl. No. 13/425,238, filed Mar. 20, 2012, dated Mar. 6, 2014.
Office Action for U.S. Appl. No. 13/312,903, filed Dec. 6, 2011, dated Nov. 12, 2013.
Office Action for U.S. Appl. No. 13/092,873, filed Apr. 22, 2011, dated Nov. 29, 2013.
Office Action for U.S. Appl. No. 13/194,526, filed Jul. 16, 2011, dated Dec. 2, 2013.
Office Action for U.S. Appl. No. 13/092,460, filed Apr. 22, 2011, dated Mar. 14, 2014.
Office Action for U.S. Appl. No. 13/042,259, filed Mar. 7, 2011, dated Jan. 16, 2014.
Office Action for U.S. Appl. No. 13/092,580, filed Apr. 22, 2011, dated Jan. 10, 2014.
Office Action for U.S. Appl. No. 13/092,877, filed Apr. 22, 2011, dated Jan. 6, 2014.
Office Action for U.S. Appl. No. 13/092,752, filed Apr. 22, 2011, dated Apr. 9, 2014.
Office Action for U.S. Appl. No. 13/092,701, filed Apr. 22, 2011, dated Mar. 14, 2014.
Office Action for U.S. Appl. No. 13/092,724, filed Apr. 22, 2011, dated Apr. 9, 2014.
Office Action for U.S. Appl. No. 13/098,490, filed May 2, 2011, dated Mar. 27, 2014.
Office Action for U.S. Appl. No. 13/533,843, filed Jun. 26, 2012, dated May 14, 2014.
Office Action for U.S. Appl. No. 13/484,072, filed May 30, 2012, dated May 9, 2014.
Office Action for U.S. Appl. No. 13/030,806, filed Feb. 18, 2011, dated Apr. 22, 2014.
Office Action for U.S. Appl. No. 13/092,701, filed Apr. 22, 2011, dated Mar. 26, 2014.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, ED K. et al., 'Virtual Private LAN Service (VPLS) Using BGP for Auto-Discovery and Signaling' Jan. 2007.
Rosen, E. et al., "BGP/MPLS VPNs", Mar. 1999.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Touch, J. et al., 'Transparent Interconnection of Lots of Links (TRILL): Problem and Applicability Statement', May 2009, Network Working Group, pp. 1-17.
Zhai F. Hu et al. 'RBridge: Pseudo-Nickname; draft-hu-trill-pseudonode-nickname-02.txt', May 15, 2012.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.

(56) References Cited

OTHER PUBLICATIONS

Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.

* cited by examiner

END-TO END LOSSLESS ETHERNET IN ETHERNET FABRIC

RELATED APPLICATIONS

This application claims the benefit of U.S. Provisional Application No. 61/528,683, titled "Method for Providing End-to-End Lossless Ethernet in Ethernet Fabrics/VCS," by inventors Huan Song, Phanidhar Koganti, Mythilikanth Raman, and Rajnish Gupta, filed 29 Aug. 2011, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, and to U.S. patent application Ser. No. 13/092,752, titled "Name Services for Virtual Cluster Switching," by inventors Suresh Vobbilisetty, Phanidhar Koganti, and Jesse B. Willeke, filed 22 Apr. 2011, the disclosures of which are incorporated by reference herein.

BACKGROUND

Field

The present disclosure relates to network management. More specifically, the present disclosure relates to a method and system for automatic reliable layer-2 communication.

Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as high-speed layer-2 communication, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switch form a single, logical switch that can have an arbitrary number of ports and an arbitrary topology. As demands grow, customers can adopt a "pay as you grow" approach to scale up the capacity of the fabric switch.

As more data-intensive applications are deployed, layer-2 communication is becoming progressively more important as a value proposition for network architects. It is desirable to provide lossless data flows on layer-2 links to facilitate reliable communication among switches while providing the flexibility and ease of deployment of the layer-2 communication.

While Ethernet fabric switches bring many desirable features to networks, some issues remain unsolved in reliable layer-2 communication.

SUMMARY

One embodiment of the present invention provides a computing system. The computing system includes a packet processor and a flow control module. During operation, the packet processor identifies a class of service indicating priority-based flow control associated with a remote computing system from a notification message. The flow control module self-configure priority-based flow control for the class of service in the computing system.

In a variation on this embodiment, the flow control module creates a buffer dedicated for frames belonging to the class of service received from the remote computing system in response to identifying the class of service.

In a variation on this embodiment, the computing system is operable to create a pause frame in response to a status of the buffer, wherein the pause frame corresponds to the class of service.

In a variation on this embodiment, the data monitoring module examines inner Ethernet header of a received frame encapsulated in a Transparent Interconnection of Lots of Links (TRILL) header to determine whether the frame belongs to the class of service.

In a variation on this embodiment, the notification message contains a virtual switch identifier as source address.

In a variation on this embodiment, the computing system also include a fabric switch module which assigns an identifier to the computing system, wherein the identifier is associated with a fabric switch which accommodates a plurality of computing systems and operate as a single logical switch.

One embodiment of the present invention provides a computing system. The computing system includes an identification module, a packet processor, and a notification module. an identification module configurable to identify a class of service associated with priority-based flow control configured for the computing system. The packet processor identifies whether a frame belongs to the class of service. The notification module, in response to identifying the class of service, creates a notification message containing the class of service associated with the priority-based flow control for a remote computing system.

In a variation on this embodiment, the notification message is an Ethernet frame encapsulated in a TRILL header.

In a variation on this embodiment, the computing system also include a fabric switch module which assigns an identifier to the computing system, wherein the identifier is associated with a fabric switch which accommodates a plurality of computing systems and operate as a single logical switch.

DETAILED DESCRIPTION

Figure 1:
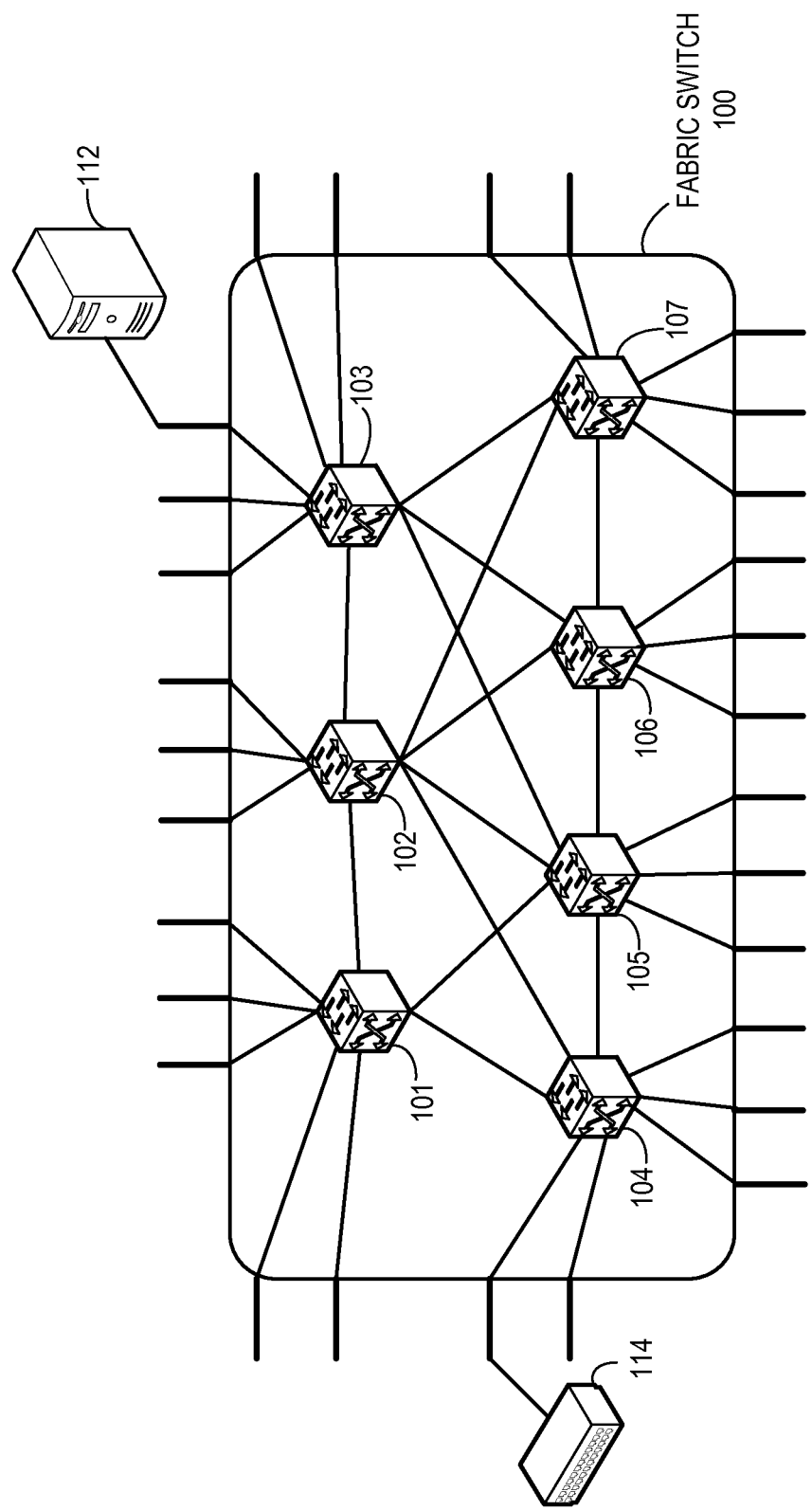
FIG. 1 illustrates an exemplary fabric switch, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of providing lossless layer-2 connectivity in a fabric switch is solved by automatically configuring priority-based flow control in all member switches of the fabric switch. When priority-based flow control is configured in one of the member switches, the switch sends the associated configuration information to all other switches. Upon receiving the configuration information, all the other switches automatically self-configure priority-based flow control. A layer-2 network, such as Ethernet, can readily facilitate plug-and-play services and does not require complex configuration. Because a respective interface on a layer-2 switch has a default network address (e.g., a media access control (MAC) address), the interface does not require any address configuration. Furthermore, a layer-2 switch does not rewrite the header of a frame, resulting in a lighter load on hardware and a better performance.

Typically, a layer-2 network does not provide reliable data delivery. Lossless transmission adds reliability to a layer-2 network. Lossless transmission is typically provided by incorporating flow control functionalities on layer-2 links. A receiver (e.g., an end device or an Ethernet switch) sends feedback to a corresponding sender regarding buffer availability at the receiver. In some embodiments, a receiver uses a control message (can be referred to a "pause frame") to send the feedback. One such implementation for Ethernet is specified in Institute of Electrical and Electronics Engineers (IEEE) specification 802.1Qbb, "Priority-based Flow Control," available at http://www.ieee802.org/1/pages/802.1bb.html. If a receiver receives data frames for a specific class of service at a greater rate than that which the receiver can process, the buffer at the receiver overflows. As a result, the receiver drops the corresponding frames. Because layer-2 communication typically does not provide feedback, these frames are not recovered by layer-2; rather, the upper-layer protocols are responsible for the lost data recovery.

When a priority-based flow control enabled receiver predicts a potential buffer overflow for a class of service, the receiver sends a pause frame notifying the corresponding sender about the buffer overflow. A class of service can be represented by a priority value. For example, IEEE 802.1Qbb specifies eight classes of services that are identified by priority values 0 to 7, respectively. The pause frame contains the priority value corresponding to the class of service. Upon receiving the pause frame, the sender extracts the priority value and stops the transmission of any subsequent frames belonging to the class of service. When the receiver is ready to accept more frames, the receiver sends another control message (can be referred to as an "unpause frame") to the sender requesting the sender to start transmitting frames for that class of service again. In this way, applications requiring flow control can send frames using the same link with applications that do not prefer flow control. This technique can be referred to as "priority-based flow control."

To provide priority-based flow control in the switches of a network, a network administrator individually configures a respective switch in the network for a respective class of service. As a result, whenever a new switch is added to the network, the network administrator needs to configure priority-based flow control in that switch. Furthermore, whenever a new flow travelling through the network (e.g., a new application transmitting over the network) requires link-level flow control, the network administrator configures priority-based flow control for the corresponding class of service in all the switches in the network. In today's dynamic networking paradigm, addition or removal of a switch data flow of a new application in a network is frequent. Consequently, the network administrator may repetitiously perform the tedious and error-prone task of configuring priority-based flow control on the switches.

To solve this problem, when priority-based flow control is configured on a layer-2 switch for a class of service, the switch can propagate the associated configuration information to other switches in the network, and these other switches then automatically self-configure the priority-based flow control for that specific class of service. In some embodiments, the layer-2 network can be a fabric switch. A fabric switch in the network can be an Ethernet fabric switch or a virtual cluster switch (VCS). In an Ethernet fabric switch, any number of switches coupled in an arbitrary topology may logically operate as a single switch. Any new switch may join or leave the fabric switch in "plug-and-play" mode without any manual configuration. In some embodiments, a respective switch in the Ethernet fabric switch is a Transparent Interconnection of Lots of Links (TRILL) routing bridge (RBridge). A fabric switch appears as a single logical switch to the end device.

In a fabric switch, the network administrator only needs to specify the priority value corresponding to the class of service which needs to be lossless on one of the edge ports (i.e., a port which connects to a device outside of the fabric) of a member switch. The member switch advertises the priority value to other switches in the fabric switch. In some embodiments, the member switch uses an internal messaging service of the fabric switch to advertise the priority. Upon receiving the priority, a respective member switch enables priority-based flow control for a respective inter-switch port in the fabric switch for the corresponding class of service. In this way, when the network administrator configures priority based flow control in one of the member switches for a class of service, priority-based flow control is configured for all inter-switch ports automatically. As a result, the network administrator can facilitate end-to-end lossless transmission in a layer-2 fabric switch. Note that these inter-switch ports create the internal links (can be referred to as inter-switch links) in a fabric switch.

Although the present disclosure is presented using examples based on the layer-2 protocols, embodiments of the present invention are not limited to layer-2 networks. Embodiments of the present invention are relevant to any networking protocol which does not provide lossless communication between two networking devices. In this disclosure, the term "layer-2 network" is used in a generic sense, and can refer to any networking layer, sub-layer, or a combination of networking layers.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "end device" can refer to a host machine, a conventional switch, or any other type of network device. Additionally, an end device can be coupled to other switches or hosts further away from a network. An end device can also be an aggregation point for a number of switches to enter the network.

The term "switch identifier" refers to a group of bits that can be used to identify a switch. If a switch is an RBridge, the switch identifier can be referred to as an "RBridge identifier." Note that the TRILL standard uses "RBridge ID" to denote a 48-bit Intermediate-System-to-Intermediate-System (IS-IS) ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to an end device can be referred to as a "switch." Examples of a "network device" include, but are not limited to, a layer-2 switch, a layer-3 router, or a TRILL RBridge.

The term "priority-based flow control" is used in a generic sense, and it can refer to any flow control mechanism that can be used by end devices and switches. An example of such protocol includes, but is not limited to, IEEE 802.1Qbb standard for Ethernet.

The term "Ethernet fabric switch" or "VCS" refers to a number of interconnected physical switches which form a single, scalable logical switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally.

Network Architecture

FIG. 1 illustrates an exemplary fabric switch, in accordance with an embodiment of the present invention. As illustrated in FIG. 1, a fabric switch 100 includes member switches 101, 102, 103, 104, 105, 106, and 107. End devices 112 and 114 are coupled to fabric switch 100 via member switches 103 and 104, respectively. Member switches in fabric switch 100 use edge ports to communicate to end devices and inter-switch ports to communicate to other member switches. For example, switch 104 is coupled to end device 114 via an edge port and to RBridges 105, 101, and 102 via inter-switch ports. An end host coupled to an edge port may be a host machine or network device. For example, end device 112 can be a host machine, while end device 114 can be a layer-2 switch. In some embodiments, fabric switch 100 is a TRILL network, wherein switches 101-107 are TRILL RBridges. The inter-switch ports for a TRILL network can be referred to as TRILL ports. Data frames transmitted and received via TRILL ports are encapsulated in TRILL headers.

In some embodiments, fabric switch 100 appears as a single logical switch to end devices 112 and 114. To facilitate this logical appearance, fabric switch 100 ensures automatic priority-based flow control configuration for the member switches. When any member switch in fabric switch 100 is configured for priority-based flow control for a class of service, the member switch propagates the associated configuration information to other member switches in fabric switch 100. Upon receiving the configuration information, other member switches self-configure the priority-based flow control for that specific class of service. During operation, a network administrator specifies a priority value (e.g., a priority value of 3) corresponding to the class of service which needs to be lossless on the edge port coupling end device 112. This information is propagated to all other member switches of fabric switch 100. A respective member switch automatically self-configures priority-based flow control for the class of service corresponding to the priority value of 3.

When the network administrator configures priority-based flow control with the priority value of 3 for the port coupling switch 103 and end device 112, switch 103 dedicates a buffer for the class of service corresponding to the priority value of 3. Switch 103 creates a notification message for all other member switches of fabric switch 100. The message indicates that a priority-based flow control for a class of service with a priority value of 3 has been configured in switch 103. In some embodiments, the notification message is an internal message of fabric switch 100. Such an internal message can be encapsulated in TRILL and/or Fibre Channel (FC) headers. Upon receiving the notification message, a respective member switch of fabric switch 100 configures priority-based flow control for a respective local inter-switch port automatically. Such a configuration includes creating a buffer for the class of service for a respective inter-switch link. For example, upon receiving the notification, switch 107 configures priority-based flow control by dedicating a buffer for the class of service corresponding to a priority value of 3 for a respective port coupling switch 107 to switches 102, 103, and 106.

If the network administrator configures priority-based flow control for another class of service with a priority value of 5 for the edge port coupling end device 114 to fabric switch 100, switch 104 notifies all other switches in fabric switch 100. A respective switch in fabric switch 100 then configures priority-based flow control for the class of service corresponding to a priority value of 5 on a respective inter-switch port. If a new member switch joins fabric switch 100, the new switch receives all priority-based flow control configurations for fabric switch 100. In this example, if switch 101 is a new switch joining fabric switch 100, neighbor switches 102, 104, and 105 can notify switch 101 about priority-based flow control for the priority values of 3 and 5. Upon receiving the notification, switch 101, in conjunction with switches 102, 104, and 105, configures the priority-based flow control for the corresponding inter-switch ports.

During operation, if end device 112 predicts a potential overflow of the dedicated buffer for the class of service with a priority value of 3, end device 112 sends a pause frame notifying switch 103 about the buffer overflow. Upon receiving the pause frame, switch 103 extracts the priority value of 3 from the pause frame and stops the transmission of any subsequent frames associated with the corresponding class of service. Switch 103 also notifies all other switches in fabric switch 100. In some embodiments, switch 103 notifies only the switches in fabric switch 100 that forward frames for the corresponding class of service. For example, the frames for the class of service corresponding to the priority value of 3 can travel from end device 114 to end device 112 sequentially via switches 104, 105, and 103. Switch 103 then notifies switch 105 about the pause frame. Switch 105, in turn, stops the transmission of any subsequent frames associated with the corresponding class of service and notifies switch 104.

When end device 112 is ready to accept more frames, end device 112 sends an unpause frame requesting switch 103 to start transmitting frames for the class of service with the priority value of 3. Upon receiving the control message, switch 103 starts the transmission of frames belonging to the class of service to end device 112 again. Switch 103 also notifies switch 105 about the unpause frame. Switch 105, in turn, starts the transmission of the frames belonging to the class of service and notifies switch 104. In some embodiments, notifications of pause and unpause frames in a fabric switch are encapsulated in TRILL and/or FC headers.

TRILL Network

Figure 2:
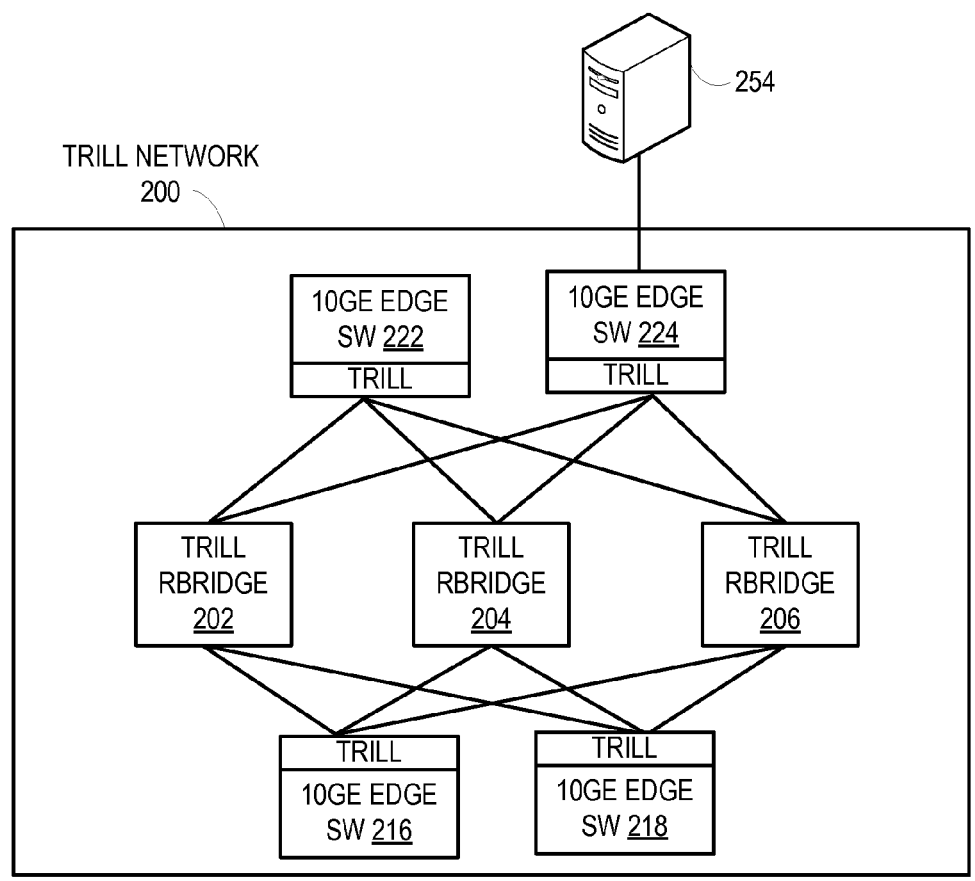
FIG. 2 illustrates an exemplary TRILL network, in accordance with an embodiment of the present invention.

In some embodiments, fabric switch 100 can be a TRILL network. The switches in the network are TRILL RBridges, with TRILL as the interconnection protocol. FIG. 2 illustrates an exemplary TRILL network, in accordance with an embodiment of the present invention. In this example, a TRILL network 200 includes a number of TRILL RBridges 202, 204, and 206. Network 200 also includes RBridges 216, 218, 222, and 224, each with a number of edge ports which can be coupled to external networks. For example, RBridge 224 is coupled with end device 254 via 10GE edge ports. RBridges in network 200 are interconnected with each other using TRILL ports. In some embodiments, TRILL network 200 can be a VCS.

In some embodiments, TRILL network 200 appears as a single logical networking device to end device 254. A network administrator specifies a priority value (e.g., a priority value of 3) corresponding to the class of service which needs to be lossless on the edge port of RBridge 224 which couples to end device 254. RBridge 224 dedicates a buffer for the class of service corresponding to the priority value of 3. RBridge 224 then creates a notification message containing the priority value, encapsulates the notification message in a TRILL header, and forwards the frame to all other RBridges in network 200. RBridge 224 can further encapsulate the TRILL frame in an FC header. In some embodiments, RBridge 224 distributes the notification message to all other RBridges using multicast. Upon receiving the notification message, a respective RBridge extracts the notification message from the TRILL header, identifies the priority value, and configures priority-based flow control for the corresponding class of service on a respective local inter-switch port automatically. Such a configuration includes creating a buffer for the class of service for a respective inter-switch port. For example, upon receiving the notification, RBridge 216 configures priority-based flow control by dedicating a buffer for the class of service for a respective port coupling RBridge 216 to RBridges 202, 204, and 206.

During operation, a respective RBridge examines a respective TRILL-encapsulated frame travelling though network 200 for a priority value of 3. If a frame contains the priority value of 3, a respective RBridge applies priority-based flow control for that frame. For example, if the frame is coming to RBridge 224 via RBridges 204 and 216, and RBridge 224 predicts a potential overflow of the dedicated buffer for the class of service with a priority value of 3, RBridge 224 sends a pause frame notifying RBridge 204 about the buffer overflow. Upon receiving the pause frame, RBridge 204 extracts the priority value of 3 from the pause frame and stops the transmission of any subsequent frames belonging to the class of service. RBridge 204 also notifies RBridge 216 about the pause frame. RBridge 216, in turn, stops the transmission of any subsequent frames belonging to the class of service.

When RBridge 224 is ready to accept more frames, RBridge 224 sends an unpause frame requesting RBridge 204 to start transmitting frames for the class of service with the priority value of 3. Upon receiving the control message, RBridge 204 starts encapsulating the frames belonging to the class of service in TRILL headers and sending the TRILL frames to RBridge 224. RBridge 204 also notifies RBridge 216 about the control message. RBridge 216, in turn, starts the transmission of the TRILL frames belonging to the class of service to RBridge 204.

Automatic Configuration

Figure 3A:
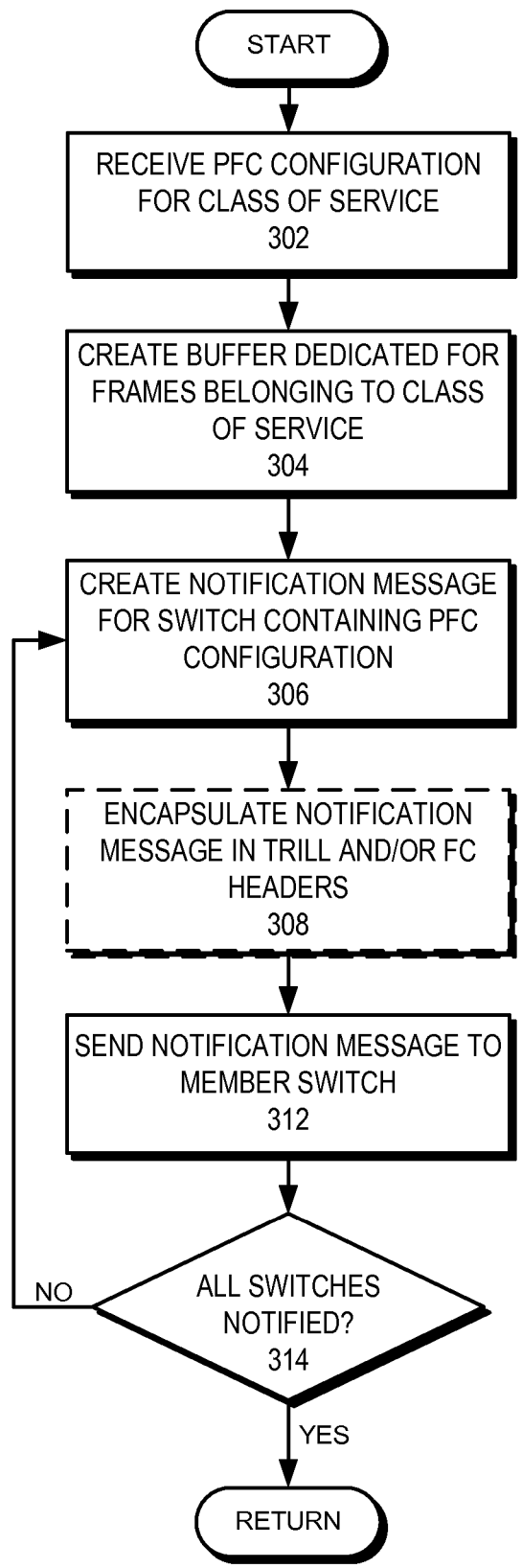
FIG. 3A presents a flowchart illustrating the process of a switch distributing priority-based flow control configuration information to other switches, in accordance with an embodiment of the present invention.

When priority-based flow control is configured for the port coupling end device 112 to switch 103 in FIG. 1, switch 103 distributes the configuration information to all other member switches. Based on the received information, all other member switches in fabric switch 100 automatically self-configure priority-based flow control on the inter-switch ports of fabric switch 100. FIG. 3A presents a flowchart illustrating the process of a switch distributing priority-based flow control configuring information to other switches, in accordance with an embodiment of the present invention. Upon receiving configuration information associated with a class of service (operation 302), the switch creates a buffer dedicated for frames belonging to the class of service (operation 304). In some embodiments, a network administrator can configure the priority-based flow control for the switch.

The switch then creates a notification message (e.g., another member switch in a fabric switch) containing the priority-based flow control configuration for another switch in the network (operation 306). This notification message can be an Ethernet control message. In some embodiments, the switch can, optionally (denoted by dashed lines), further encapsulate the notification message in a TRILL and/or an FC header (operation 308). The switch sends the notification message to the member switch (operation 312) and checks whether all switches in the network (or a fabric switch) have been notified (operation 314). If not, the switch creates notification message for another switch (operation 306). In some embodiments, the switch uses multicast to distribute the notification message.

Figure 3B:
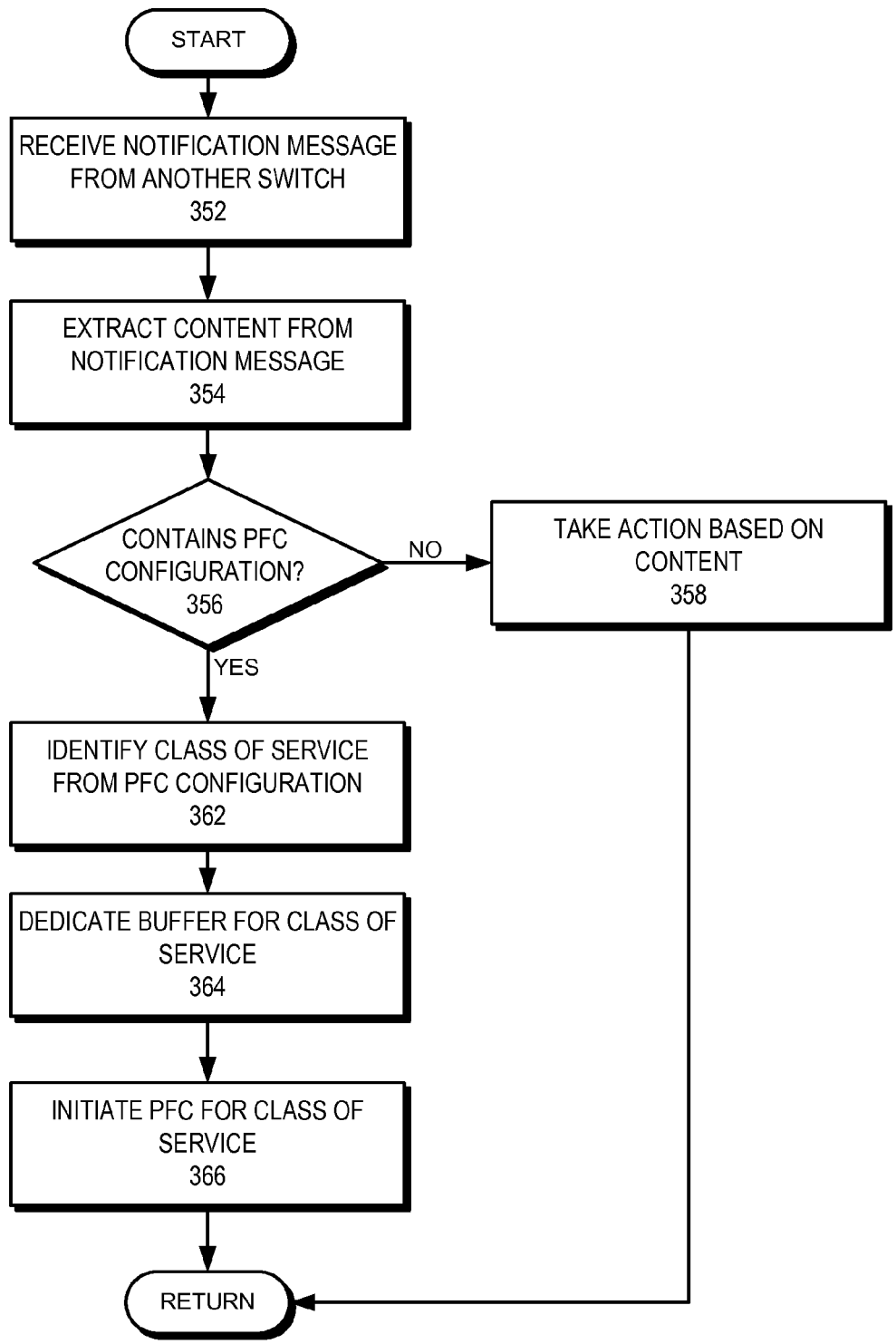
FIG. 3B presents a flowchart illustrating the process of a switch self-configuring priority-based flow control based on received information from another switch, in accordance with an embodiment of the present invention.

FIG. 3B presents a flowchart illustrating the process of a switch self-configuring priority-based flow control based on received information from another switch, in accordance with an embodiment of the present invention. Upon receiving a notification message from another switch (operation 352), the switch extracts content from the notification message (operation 354). In some embodiments, the extraction of the content includes decapsulation of a TRILL and/or an FC header of an Ethernet frame. The switch then checks whether the notification message contains any priority-based flow control configuration (operation 356). In some embodiments, the switch examines a message type and an associated operation code of the message to determine whether the message pertains to priority-based flow control. If the message does not contain any priority-based flow control configuration, the switch takes action based on the content of the message (operation 358).

If the message contains priority-based flow control configuration, the switch identifies the class of service from the configuration (operation 362). In some embodiments, the switch identifies the class of service by identifying a priority value associated with the class in the message. The switch then dedicates a buffer for the class of service (operation 364) and initiates priority-based flow control for the class of service (operation 366). Such initiation can include, but is not limited to, monitoring the dedicated buffer, identifying a potential overflow, and calculating time to transmit frames, both current and incoming, from the buffer. In some embodiments, the switch uses priority-based flow control specified by 802.1Qbb, the disclosure of which is incorporated herein in its entirety.

Forwarding Operation

Figure 4:
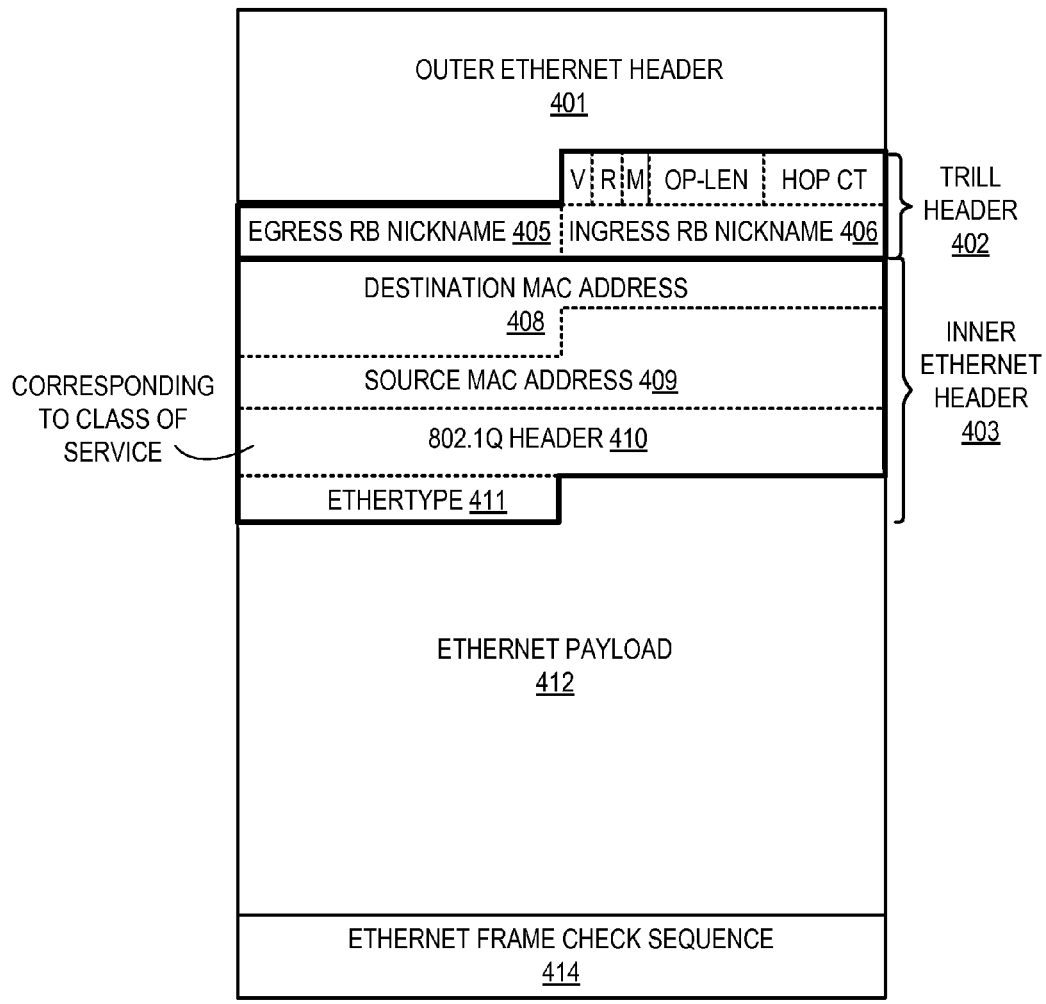
FIG. 4 illustrates an exemplary header configuration of a priority-based flow control enabled TRILL frame, in accordance with an embodiment of the present invention.

In the example in FIG. 2, a respective RBridge in network 200 inspects TRILL-encapsulated frames destined to end device 254. FIG. 4 illustrates an exemplary header configuration of a priority-based flow control enabled TRILL frame, in accordance with an embodiment of the present invention. For all frames forwarded through network 200 in FIG. 2, outer Ethernet header 401 contains the MAC addresses of the next-hop and the transmitting RBridges in the TRILL network. In this example, the frame's option-field-length ("OP-LEN") field indicates the length of its TRILL option field. The egress RBridge nickname field 405 and ingress RBridge nickname field 406 carry the nickname of the egress and ingress RBridges, respectively. To properly identify the RBridge nicknames, the ingress RBridge in the TRILL network is assumed to be capable of encoding TRILL header 402, and the egress RBridge to which it is destined is likewise assumed to be capable of decoding this field. Note that the top two bits of the first octet of the options area are a Critical Hop by Hop (CHbH) bit and a Critical Ingress to Egress (CItE) bit. The CHbH bit can be set to zero, and the CItE bit can be set to one. This way, only the ingress and egress RBridges are required to parse the option field, while a transit RBridge can ignore the existence of this option and perform its forwarding as if the option field is not present in the frame.

Inner Ethernet header 403 includes a destination MAC address 408 and a source MAC address 409. For example, in FIG. 1, any frame sent from end device 112 to end device 114 has the MAC address of end device 112 as the source MAC address 409 and the MAC address of end device 114 as the destination MAC address 408. The priority value of a class of service for the Ethernet frame is included in 802.1Q header 410. Ethertype 411 indicates the type of the Ethernet frame (e.g., an Ethernet control frame). Ethernet payload 412 contains the data carried by the Ethernet frame, and Ethernet frame check sequence 414 is used to check the integrity of the Ethernet frame.

Figure 5:
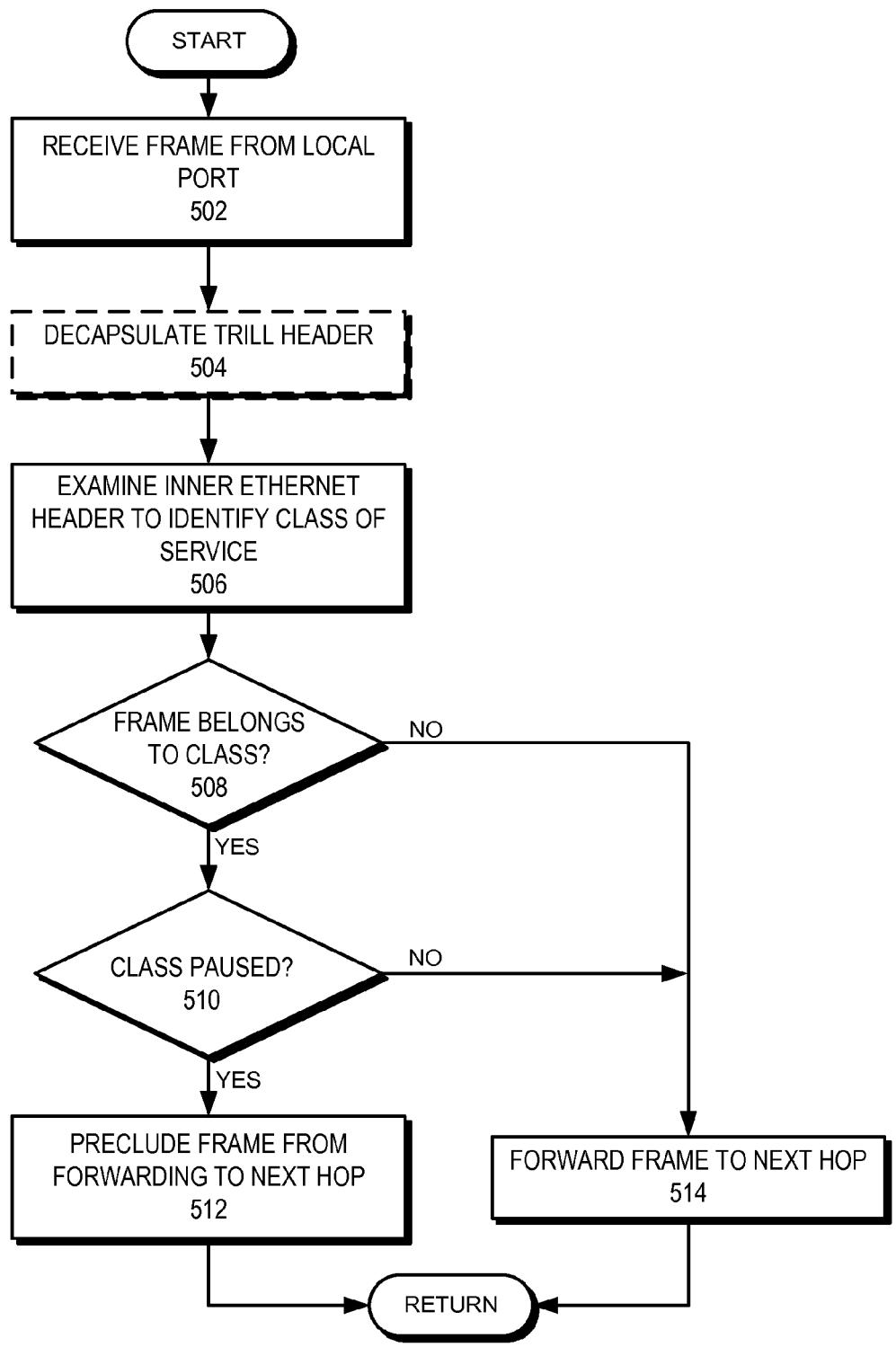
FIG. 5 presents a flowchart illustrating the process of a switch forwarding priority-based flow control enabled frames, in accordance with an embodiment of the present invention.

FIG. 5 presents a flowchart illustrating the process of a switch forwarding priority-based flow control enabled frames, in accordance with an embodiment of the present invention. The switch first receives a frame from a local port (operation 502). This local port can be an edge port or an inter-switch port. If the switch is a TRILL RBridge, the received frame can be TRILL-encapsulated, as described in conjunction with FIG. 4, and the switch, optionally, decapsulates the TRILL header of the frame (operation 504). The switch examines the inner Ethernet header to identify the class of service associated with the frame (operation 506). The switch can also directly examine the inner Ethernet header of a TRILL-encapsulated frame to identify the class of service. In some embodiments, the switch examines an 802.1Q header field to identify the class of service, as described in conjunction with FIG. 4.

The switch then checks whether the frame belongs to a class for which priority-based flow control is enabled (operation 508). If multiple such classes exist, the switch checks for a respective such class. If the frame belongs to one of these classes, the switch checks whether the class of service is paused for the next-hop receiver (operation 510). If the class is paused, the switch precludes the frame from forwarding to the next-hop switch (operation 512). If the frame does not belong to a class for which priority-based flow control is enabled (operation 508) or the class is not paused (operation 510), the switch forwards the frame to the next-hop (operation 514). The next-hop can be a switch or an end device.

Priority-Based Flow Control

Figure 6:
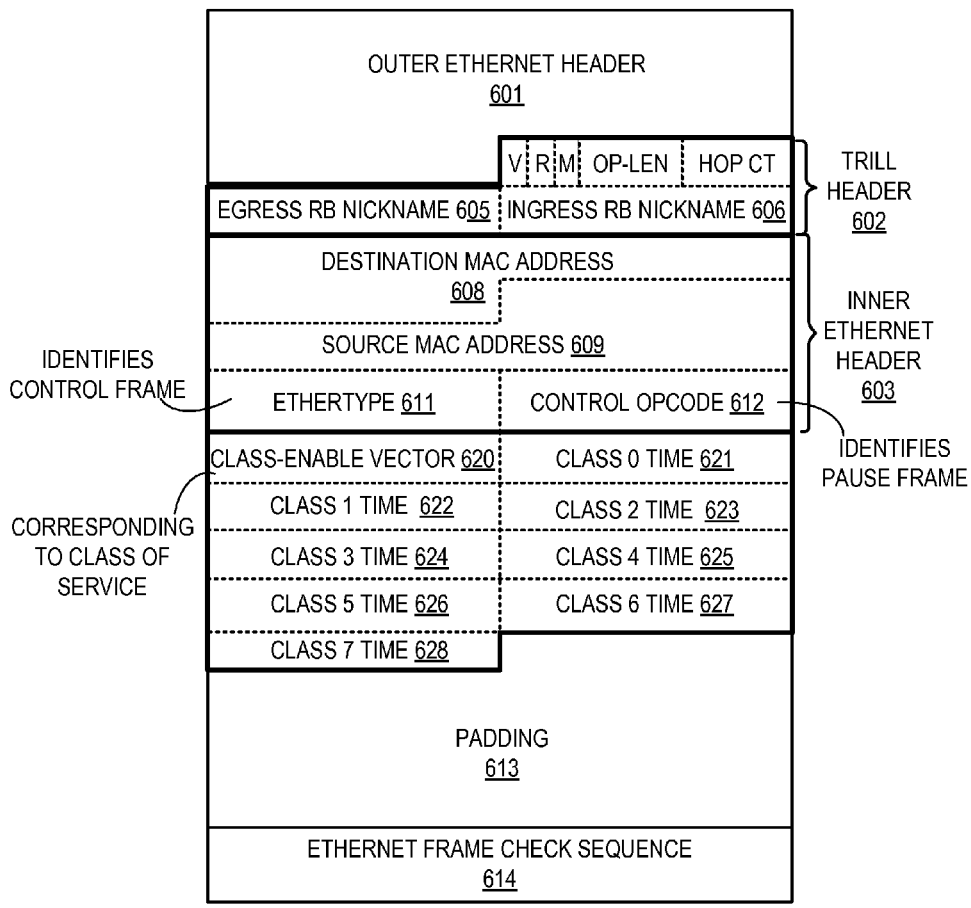
FIG. 6 illustrates an exemplary header configuration of a TRILL-encapsulated pause frame, in accordance with an embodiment of the present invention.

In the example in FIG. 2, if RBridge 224 detects a potential buffer overflow, RBridge 224 sends a pause frame encapsulated in a TRILL header to upstream RBridges. FIG. 6 illustrates an exemplary header configuration of a TRILL-encapsulated pause frame, in accordance with an embodiment of the present invention. For all frames forwarded through network 200 in FIG. 2, outer Ethernet header 601 contains the MAC addresses of the next-hop and the transmitting RBridges in the TRILL network. The egress RBridge nickname field 605 and ingress RBridge nickname field 606 carry the nickname of the egress and ingress RBridges, respectively. To properly identify the RBridge nicknames, the ingress RBridge in the TRILL network is assumed to be capable of encoding TRILL header 602, and the egress RBridge to which it is destined is likewise assumed to be capable of decoding this field. Padding 613 is used for alignment and Ethernet frame check sequence 614 is used to check the integrity of the Ethernet frame.

Inner Ethernet header 603 includes a destination MAC address 608 and a source MAC address 609. For example, in FIG. 1, any frame sent from end device 112 to end device 114 has the MAC address of end device 112 as the source MAC address 609 and the MAC address of end device 114 as the destination MAC address 608. Ethertype 611 indicates the type of the Ethernet frame. For example, Ethertype 611 can indicate an Ethernet control frame. Note that a pause frame is a control frame. Operation code 612 indicates an operation type of the control frame. For example, operation code 612 can indicate that the control frame is a pause frame.

Class-enable vector 620 indicates whether priority-based flow control has been enabled for a class of service. Class-enable vector 620 contains a bit vector for the available classes, wherein a set bit (i.e., a bit set to 1) indicates that priority-based flow control has been enabled for the corresponding class. In other words, class-enable vector 620 indicates the priority values for which priority-based flow control has been enabled. Time quanta 621-628 indicate the pause duration for the corresponding classes of service. In some embodiments, a respective quantum represents the time needed to transmit 512 bits at the current network speed. To initiate transmission for a class (i.e., to unpause), the corresponding pause duration is set to zero. For example, a bit vector of "00010100" can indicate that priority-based flow control is enabled for priority values of 3 and 5. Times 624 and 626 represents the pause duration for the corresponding classes of services. If time 624 or 626 is set to zero, it indicates an unpause request for the corresponding class of service.

Figure 7A:
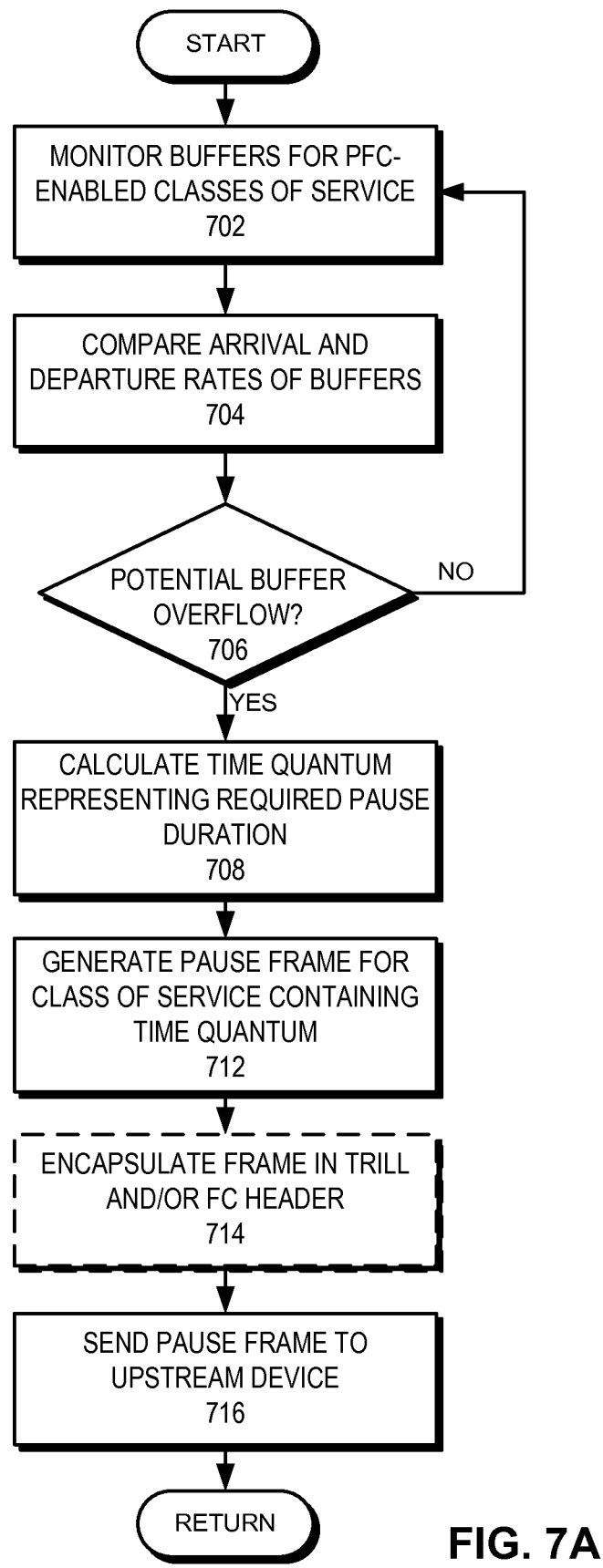
FIG. 7A presents a flowchart illustrating the process of a switch monitoring potential buffer overflow for a class of service, in accordance with an embodiment of the present invention.

FIG. 7A presents a flowchart illustrating the process of a switch monitoring potential buffer overflow for a class of service, in accordance with an embodiment of the present invention. The switch monitors the dedicated buffers associated with the priority-based flow control enabled classes of service (operation 702). The switch compares the arrival and the departure rates of frames of the buffers (operation 704). Based on the comparison, the switch checks whether any of the buffers may potentially suffer an overflow (operation 706). If not, the switch continues to monitor the buffers (operation 702).

If the switch detects a potential buffer overflow, the switch calculates a time quantum representing the required pause duration (operation 708) so that the switch can avert the buffer overflow. The switch then generates a pause frame for the class of service containing the time quantum for the buffer (operation 712). In some embodiments, the switch optionally encapsulates the frame in a TRILL and/or an FC header (operation 714) and sends the frame to the upstream device (operation 716). Note that the upstream device can be a switch or an end device.

Figure 7B:
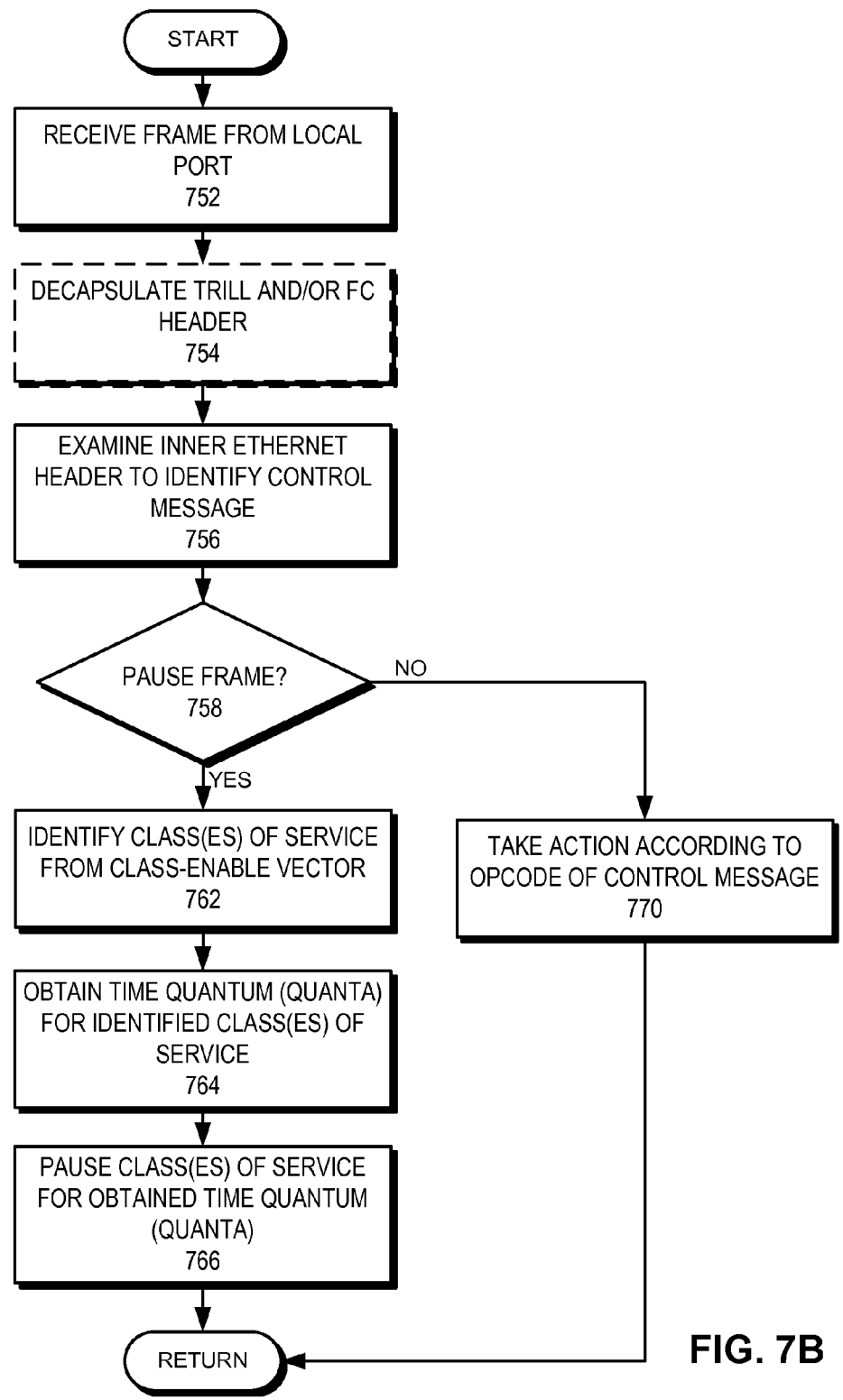
FIG. 7B presents a flowchart illustrating the process of a switch pausing transmission for a class of service, in accordance with an embodiment of the present invention.

FIG. 7B presents a flowchart illustrating the process of a switch pausing transmission for a class of service based on a received control frame, in accordance with an embodiment of the present invention. The switch first receives a frame from a local port (operation 752). In some embodiments, the frame can be encapsulated in a TRILL and/or an FC header, and the switch can, optionally, decapsulate the header (operation 754). The switch then examines the inner Ethernet header to identify whether the frame contains a control message (operation 756). If the frame contains a control message, the switch checks whether the message is a pause frame (operation 758), as described in conjunction with FIG. 6. IN some embodiments, the switch directly examines the inner Ethernet header of a TRILL-encapsulated frame to check whether the frame is a pause frame.

If the frame is not a pause frame, the switch takes action based on the operation code of the message (operation 770). If the frame is a pause frame, the switch identifies the class(es) of service associated with the pause frame (operation 762). The switch can identify the class(es) from the class-enable vector of the frame, as described in conjunction with FIG. 6. The switch obtains the time quantum (quanta) for the identified class(es) of service (operation 764). The switch then pauses forwarding frames belonging to the class(es) of service for the duration of the obtained time quantum (quanta) (operation 766).

Link Aggregation

Figure 8:
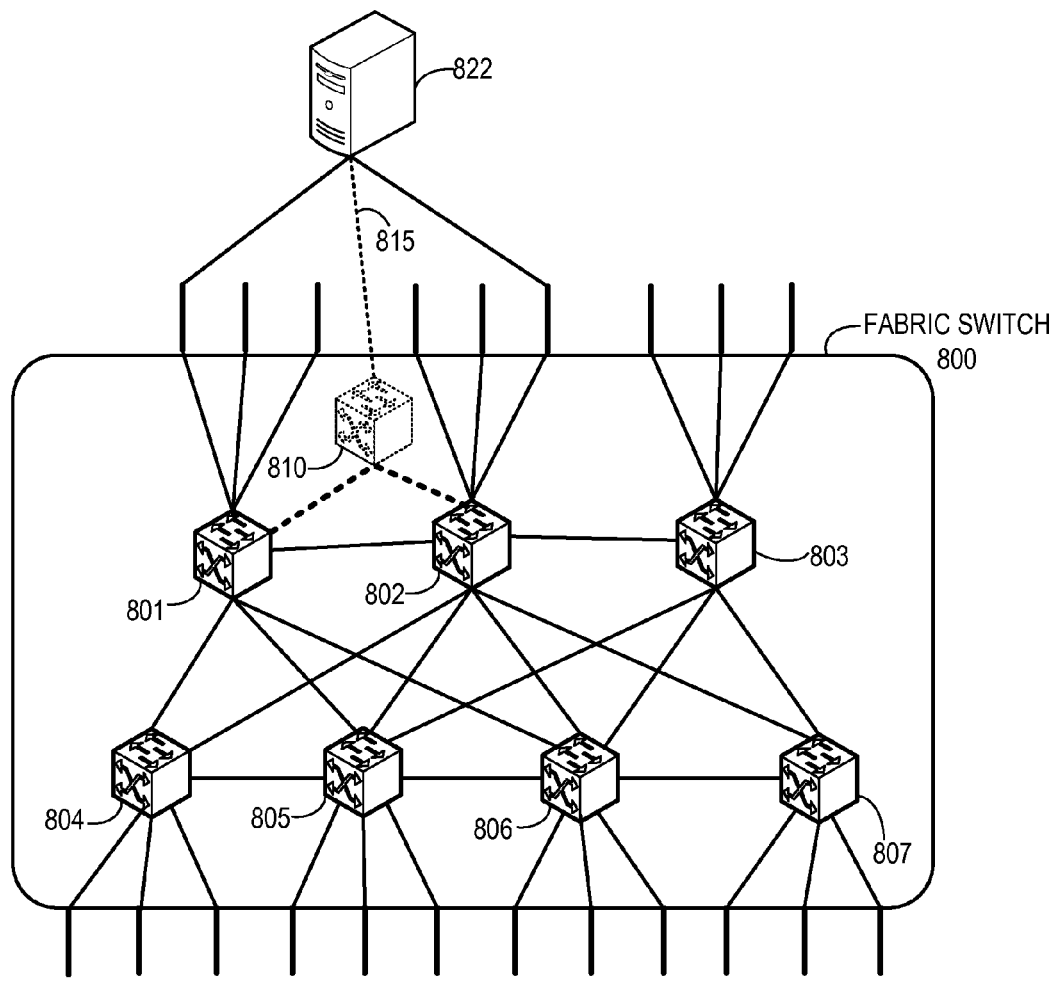
FIG. 8 illustrates an exemplary priority-based flow control enabled link aggregation, in accordance with an embodiment of the present invention.

FIG. 8 illustrates an exemplary priority-based flow control enabled link aggregation, in accordance with an embodiment of the present invention. As illustrated in FIG. 8, a fabric switch 800 includes seven member switches 801, 802, 803, 804, 805, 806, and 807. In some embodiments, fabric switch 800 is a TRILL network and the member switches are TRILL RBridges. End device 822 is dual-homed and coupled to switches 801 and 802. The goal is to allow a dual-homed end device to use both physical links to two separate switches as a single, logical aggregate link, with the same MAC address. Such a configuration would achieve true redundancy and facilitate fast protection switching.

Switches 801 and 802 are configured to operate in a special "trunked" mode for end device 822. End device 822 views switches 801 and 802 as a common virtual switch 810. In some embodiments, virtual switch 810 can be a virtual RBridge with a corresponding virtual RBridge identifier. Dual-homed end device 822 is considered to be logically coupled to virtual switch 810 via a logical link 815 (represented by a dotted line). Virtual switch 810 is considered to be logically coupled to both switches 801 and 802, optionally with zero-cost links (represented by dashed lines). Among the links in a link trunk, one link is selected to be a primary link. For example, the primary link for end device 822 can be the link to switch 801. Switches which participate in link aggregation and form a virtual switch are referred to as "partner switches." Operation of virtual switches for multi-homed end devices is specified in U.S. patent application Ser. No. 12/725,249, entitled "Redundant Host Connection in a Routed Network," the disclosure of which is incorporated herein in its entirety.

During operation, a network administrator can enable priority-based flow control for logical link 815 for a class of service. In some embodiments, the network administrator configures one of the edge ports which couple end device 822 to fabric switch 800 (e.g., the edge port in switch 801). Switch 801 then shares this configuration with partner switch 802, dedicates a buffer for the corresponding class of service, and notifies upstream switches. Switches 802 then also enables priority-based flow control and dedicates a buffer for the corresponding class of service. In some embodiments, end device 822 dedicates a buffer associated with the class of service for all links associated with the logical link and monitors the buffer for potential buffer overflow. When end device 822 receives a frame from virtual switch 810 via any link associated with logical link 810, end device 822 stores the frame in the buffer.

Upon detecting a potential buffer overflow, end device 822 generates a pause frame and sends the frame via the primary link to switch 801. Switch 801 shares the frame with partner switch 802. Consequently, both partner switches 801 and 802 stop subsequent transmission of frames to end device 822, and notify corresponding upstream switches about the pause frame. In the same way, when end device 822 has averted buffer overflow, end device 822 sends an unpause control message to switch 801, which shares the unpause control message with partner switch 802. Partner switches 801 and 802 then start sending frames associated with the class of service to end device 822 again, and notify corresponding upstream switches about the unpause control message.

Exemplary Computing System

Figure 9:
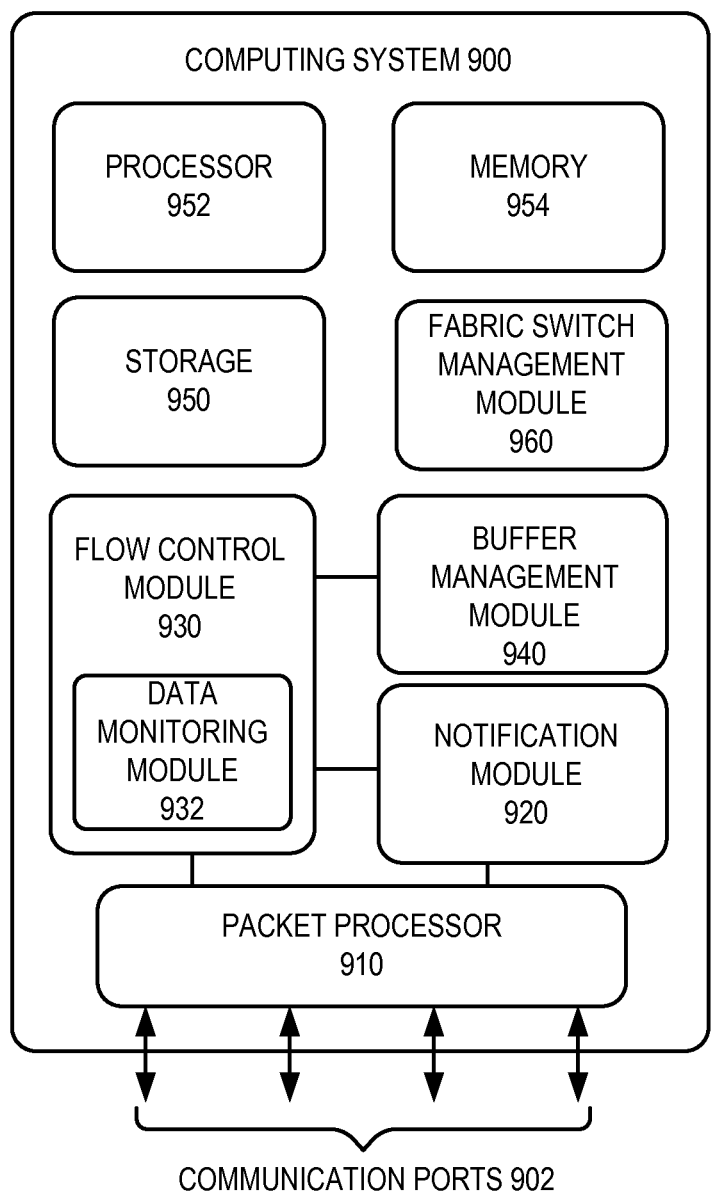
FIG. 9 illustrates an exemplary computing system, in accordance with an embodiment of the present invention.

FIG. 9 illustrates an exemplary computing system, in accordance with an embodiment of the present invention. In this example, a computing system 900 includes a processor 952, a memory 954, a number of communication ports 902, a notification module 920, a buffer management module 940, a flow control module 930, a data monitoring module 932, a packet processor 910, and a storage 950. In some embodiments, computing system 900 may maintain a membership in a fabric switch, wherein computing system 900 also includes a fabric switch management module 960. Fabric switch management module 960 maintains a configuration database in storage 950 that maintains the configuration state of every switch within the fabric switch. Fabric switch management module 960 maintains the state of the fabric switch, which is used to join other switches.

In some embodiments, computing system 900 can be configured to operate in conjunction with a remote computing system as a logical switch. Under such a scenario, communication ports 902 can include inter-switch communication channels for communication within a fabric switch. This inter-switch communication channel can be implemented via a regular communication port and based on any open or proprietary format. Communication ports 902 can include one or more TRILL ports capable of receiving frames encapsulated in a TRILL header and/or an FC header. Packet processor 910 can process these frames.

Whenever a network administrator configures computing system 900 for priority-based flow control for a class of service, computing system 900 dedicates a buffer for frames belonging to the class of service. In some embodiments, the buffer resides in memory 954. Notification module 920 creates a notification message containing the class of service indicating the configured priority-based flow control for computing system 900.

On the other hand, if computing system 900 receives such a notification message via one of the communication ports 902, packet processor 910 examines the received message and identifies the class of service associated with priority-based flow control for the source computing system. In some embodiments, the received notification message is an Ethernet frame encapsulated in a TRILL and an FC header. After computing system 900 identifies the class of service, buffer management module 940 creates a buffer dedicated for frames belonging to the class of service from the remote computing system.

Once priority-based flow control is configured for computing system 900, data monitoring module 932 monitors the buffer and detects any potential overflow of the buffer. If data monitoring module 932 detects a potential buffer overflow, flow control module 930 operates in conjunction with packet processor 910 to generate a pause frame and transmits the pause frame via one of the communication ports 902.

Note that the above-mentioned modules can be implemented in hardware as well as in software. In one embodiment, these modules can be embodied in computer-executable instructions stored in a memory which is coupled to one or more processors in computing system 900. When executed, these instructions cause the processor(s) to perform the aforementioned functions.

In summary, embodiments of the present invention provide a computing system and a method for facilitating priority-based flow control in a fabric switch. In one embodiment, the computing system includes a packet processor, a buffer management module, a data monitoring module, and a flow control module. The packet processor identifies a class of service indicating priority-based flow control associated with a remote computing system from a notification message. The buffer management module creates a buffer dedicated for frames belonging to the class of service from the remote computing system in response to identifying the class of service. The data monitoring module detects a potential overflow of the buffer. The flow control module operates in conjunction with the packet processor to generate a pause frame in response to detecting a potential overflow.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   one or more ports;
   a memory;
   packet processing circuitry configured to identify a priority value in a first inner layer-2 header of a packet encapsulated with a first outer encapsulation header, wherein the priority value indicates a class of service associated with priority-based flow control for the packet, and wherein the first outer encapsulation header comprises a first switch identifier identifying the switch and a second switch identifier identifying a second switch in a routed network; and
   flow control circuitry configured to, in response to detecting a potential buffer overflow for the class of service, generate a pause frame comprising a second inner layer-2 header for the class of service associated with the priority-based flow control, wherein the second inner layer-2 header is encapsulated with a second outer encapsulation header comprising the second switch identifier as a destination identifier, and wherein the first and second outer encapsulation headers are based on a same encapsulation protocol.

2. The switch of claim 1, wherein the potential buffer overflow is for a buffer configured to store the packet in response to the packet processor identifying the priority value indicating the class of service in the first inner layer-2 header of the packet.

3. The switch of claim 1, wherein the pause frame includes the priority value indicating the class of service.

4. The switch of claim 1, wherein the first inner layer-2 header is an Ethernet header and the first outer encapsulation header is forwardable in the routed network.

5. The switch of claim 1, wherein the first switch identifier is a virtual switch identifier associated with a virtual switch.

6. The switch of claim 1, wherein the switch is in a plurality of switches participating in a link aggregation, wherein the link aggregation includes a plurality of physical links operating as a single aggregated link, and wherein the plurality of switches are associated with a same media access control (MAC) address.

7. A switch, comprising:
identification circuitry configured to identify a class of service associated with priority-based flow control configured for the switch;
packet processing circuitry configured to identify a priority value in a first inner layer-2 header of a packet encapsulated with a first outer encapsulation header, wherein the priority value indicates the class of service associated with the priority-based flow control for the packet, and wherein the first outer encapsulation header comprises a first switch identifier identifying the switch in a routed network; and
notification circuitry configured to generate a notification message comprising a second inner layer-2 header in response to identifying the class of service, wherein the second inner layer-2 header is encapsulated with a second outer encapsulation header comprising a second switch identifier identifying a second switch in the routed network, and wherein the notification message specifies the class of service associated with the priority-based flow control configured for the switch.

8. The switch of claim 7, wherein the first inner layer-2 header is an Ethernet header and the first outer encapsulation header is forwardable in the routed network.

9. The switch of claim 7, wherein the switch is in a plurality of switches participating in a link aggregation, wherein the link aggregation includes a plurality of physical links operating as a single aggregated link, and wherein the plurality of switches are associated with a same media access control (MAC) address.

10. A method, comprising:
identifying, by a switch, a priority value in a first inner layer-2 header of a packet encapsulated with a first outer encapsulation header, wherein the priority value indicates a class of service associated with priority-based flow control for the packet, and wherein the first outer encapsulation header comprises a first switch identifier identifying the switch and a second switch identifier identifying a second switch in a routed network; and
in response to detecting a potential buffer overflow for the class of service, generating a pause frame comprising a second inner layer-2 header for the class of service associated with the priority-based flow control, wherein the second inner layer-2 header is encapsulated with a second outer encapsulation header comprising the second switch identifier as a destination identifier, and wherein the first and second outer encapsulation headers are based on a same encapsulation protocol.

11. The method of claim 10, wherein the potential buffer overflow is for a buffer configured to store the packet in response to identifying the priority value indicating the class of service in the first inner layer-2 header of the packet.

12. The method of claim 10, wherein the pause frame includes the priority value indicating the class of service.

13. The method of claim 10, wherein the first inner layer-2 header is an Ethernet header and the first outer encapsulation header is forwardable in the routed network.

14. The method of claim 10, wherein the first switch identifier is a virtual switch identifier associated with a virtual switch.

15. The method of claim 10, wherein the switch is in a plurality of switches participating in a link aggregation, wherein the link aggregation includes a plurality of physical links operating as a single aggregated link, and wherein the plurality of switches are associated with a same media access control (MAC) address.

16. A method, comprising:
identifying, by a switch, a class of service associated with priority-based flow control configured for the switch;
identifying a priority value in a first inner layer-2 header of a packet encapsulated with a first outer encapsulation header, wherein the priority value indicates the class of service associated with the priority-based flow control for the packet, and wherein the first outer encapsulation header comprises a first switch identifier identifying the switch in a routed network; and
generating a notification message comprising a second inner layer-2 header in response to identifying the class of service, wherein the second inner layer-2 header is encapsulated with a second outer encapsulation header comprising a second switch identifier identifying a second switch in the routed network, and wherein the notification message specifies the class of service associated with the priority-based flow control configured for the switch;
wherein the switch and the remote switch are member switches of the network of interconnected switches.

17. The method of claim 16, wherein the first inner layer-2 header is an Ethernet header and the first outer encapsulation header is forwardable in the routed network.

18. The method of claim 16, wherein the switch is in a plurality of switches participating in a link aggregation, wherein the link aggregation includes a plurality of physical links operating as a single aggregated link, and wherein the plurality of switches are associated with a same media access control (MAC) address.

19. A computer system, comprising:
processing circuitry; and
a non-transitory computer-readable storage medium storing instructions which when executed by the processing circuitry cause the processing circuitry to perform a method, the method comprising:
identifying a priority value in a first inner layer-2 header of a packet encapsulated with a first outer encapsulation header, wherein the priority value indicates a class of service associated with priority-based flow control for the packet, and wherein the first outer encapsulation header comprises a first identifier identifying the computer system and a second identifier identifying a second computer system in a routed network; and
in response to detecting a potential buffer overflow for the class of service, generating a pause frame comprising a second inner layer-2 header for the class of service associated with the priority-based flow control, wherein the second inner layer-2 header is encapsulated with a second outer encapsulation header comprising the second identifier as a destination identifier, and wherein the first and second outer encapsulation headers are based on a same encapsulation protocol.

20. A computer system, comprising:
processing circuitry; and
a non-transitory computer-readable storage medium storing instructions which when executed by the processing circuitry cause the processing circuitry to perform a method, the method comprising:
identifying a class of service associated with priority-based flow control configured for the computer system;
identifying a priority value in a first inner layer-2 header of a packet encapsulated with a first outer encapsulation header, wherein the priority value indicates the class of service associated with the priority-based flow control for the packet, and wherein the first outer encapsulation header comprises a first identifier identifying the computer system in a routed network; and generating a notification message comprising a second inner layer-2 header in response to identifying the class of service, wherein the second inner layer-2 header is encapsulated with a second outer encapsulation header comprising a second identifier identifying a second computer system in the routed network, and wherein the notification message specifies the class of service associated with the priority-based flow control configured for the computer system.

* * * * *